(12) United States Patent
Lee

(10) Patent No.: US 7,444,073 B2
(45) Date of Patent: Oct. 28, 2008

(54) DIGITAL CAMERA MODULE WITH AUTO-FOCUSING FUNCTION

(75) Inventor: Hsin-Ho Lee, Tu-Cheng (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 285 days.

(21) Appl. No.: 11/283,237

(22) Filed: Nov. 18, 2005

(65) Prior Publication Data
US 2006/0125925 A1 Jun. 15, 2006

(30) Foreign Application Priority Data
Dec. 10, 2004 (TW) .................................. 93138262

(51) Int. Cl.
*G03B 17/00* (2006.01)
(52) U.S. Cl. ............................. 396/72; 396/77; 396/79; 396/85; 396/532; 396/533; 348/345; 348/357
(58) Field of Classification Search ................... 396/72, 396/77, 79, 85, 532, 533; 348/345, 347, 348/357
See application file for complete search history.

(56) References Cited
U.S. PATENT DOCUMENTS
5,070,489 A * 12/1991 Perry et al. .............. 369/44.16

| 5,612,826 | A | * | 3/1997 | Ohshita | 359/819 |
| 6,228,904 | B1 | * | 5/2001 | Yadav et al. | 523/210 |
| 2003/0184878 | A1 | * | 10/2003 | Tsuzuki | 359/694 |
| 2004/0165877 | A1 | * | 8/2004 | Hsiao | 396/85 |

FOREIGN PATENT DOCUMENTS

| CN | 2004-10077450 | * 12/2004 |
| TW | 88200669 | 9/1999 |

* cited by examiner

*Primary Examiner*—W. B. Perkey
*Assistant Examiner*—Michael A Strieb
(74) *Attorney, Agent, or Firm*—Andrew C. Cheng

(57) ABSTRACT

A digital camera module (100) with an auto-focusing function is adapted for use in a foldable electronic device. The digital camera module includes a lens mount (10), a lens barrel (20), a voice coil actuator (40), and an image pick-up module (50). The lens barrel receives at least one lens (24) therein and is mounted on/in the lens mount. The lens barrel is made of a composite material including a magnetic metallic nano-powder. The voice coil actuator is adapted for cooperating with the lens barrel to form a magnetic loop. The image pick-up module is disposed under the lens mount and is configured for receiving an image from the at least one lens and converting that image to an electrical signal.

15 Claims, 4 Drawing Sheets

DIGITAL CAMERA MODULE WITH AUTO-FOCUSING FUNCTION

BACKGROUND OF THE INVENTION

1. Field of the Invention

The present invention relates generally to a digital camera module with an auto-focusing function and, more particularly, to a small-sized digital camera module with an auto-focusing function and to a portable electronic device, such as a mobile phone or a Personal Digital Assistant (PDA), having such a camera module mounted therein.

2. Discussion of the Related Art

Recently, with the development of wireless communication technologies, there are many cases where digital cameras are mounted in mobile phones or PDAs.

Generally, digital cameras are image recording media capable of photographing a plurality of still images without using film. Such a digital camera typically uses an image pickup device, which is a kind of semiconductor device, such as a Charge Coupled Device (CCD) or Complementary Metal Oxide Semiconductor (CMOS). In the digital camera, an object image formed on the image pickup device through a lens is converted into an electrical signal by the image pickup device, and the electrical signal is stored as a digital signal, e.g., in the camera unit or in a mobile phone or PDA in which the digital camera is mounted.

Since the digital camera is desirably mounted in small mobile phones or PDAs, a fixed focus lens module is usually used to facilitate mounting thereof within a small phone or PDA. However, images photographed by a digital camera module with a fixed focus lens module tend to be poor in quality. It is partly due to the fixed focus lens, which is incapable of adjusting focal length to make a clearer image.

A kind of conventional digital camera with a focusing function usually uses an actuator, such as step motor, to drive the lens module, such as disclosed in Taiwan Patent No. 88200669. Referring to FIG. 3 (Prior Art), a focusing adjusting apparatus includes an inner housing 60, a lens 62, a circular gear 64, and a step motor 66. The lens 62 and the step motor 66 are received in the inner housing 60. One end of the step motor 66 is connected with a driving gear 662. The driving gear 662 drives the circular gear 64 to rotate, which makes the lens 62 located in the circular gear 64 move. However, the focusing adjusting apparatus using such a step motor is relatively large in volume and consumes a substantial amount of power, especially relative to the amount of power that can be stored in the typical battery system of a mobile phone or PDA. As such, a step motor is not suitable to be used in mobile phone or PDA, which needs to be small and power saving.

Another kind of conventional digital camera with a focusing function usually uses an actuator such as coil motor to drive the camera lens disclosed in U.S. Patent Application No. 2004016587, published Aug. 26, 2004. Referring to FIG. 4 (Prior Art), a drive source of a camera lens is disclosed. The camera lens includes a camera lens mount 70, a telescopic lens 72, a coil stator 74, and a magnetic ring rotor 76. The coil stator 74 and the magnetic ring rotor 76 cooperate with each other to drive the telescopic lens 72. The inside of the camera lens mount 70 is built with the coil stator 74 to place the magnetic ring rotor 76 inside a designated space 742. The outside of the telescopic lens 72 is designed with an external thread member 722 to allow it to be screwed on an internal thread 764 on the inside of a spindle 762 of the magnetic ring rotor 76. The magnetic ring rotor 76 rotates under the reaction induced by the coil stator 74, and the internal thread 764 of the spindle 762 drives the external thread 722 of the telescopic lens 72 for telescopic motion. However, the presence of the magnetic rotor 76 increases the weight of the digital camera lens. Further, the combination of the coil stator 74, the magnetic ring rotor 76, the external thread member 722, and the telescopic lens 72, together, will occupy a relatively large volume, and the adjustment of such a combination will consume a substantial amount of power, especially relative to the amount of power that can be stored in the typical battery system of a mobile phone or PDA.

What is needed, therefore, is a digital camera module with an auto-focusing function, which satisfies the needs for performance enhancement, downsizing, and power saving.

SUMMARY OF THE INVENTION

A digital camera module with auto-focusing function is adapted for use in a foldable electronic device. The digital camera module includes a lens mount, a lens barrel, a voice coil actuator, and an image pick-up module. The lens barrel receives at least one lens therein and is mounted on/in the lens mount. The lens barrel is made of a material having a magnetic metallic nano-powder mixed therein. The voice coil actuator is adapted for cooperating with the lens barrel to form a magnetic loop. The image pick-up module is disposed under the lens mount and is configured for generating a signal based upon an image picked up from the at least one lens.

A main advantage of the digital camera module with auto-focusing function is that a magnetic field loop is produced between the voice coil actuator and the lens barrel to drive the telescopic movement of the lens barrel. There are no any additional element between the voice coil actuator and the lens barrel, such as magnet or stepper motor. The digital camera module with auto-focusing function has simply structure.

Other advantages and novel features will become more apparent from the following detailed description when taken in conjunction with the accompanying drawings.

BRIEF DESCRIPTION OF THE DRAWINGS

Many aspects of the digital camera module with an auto-focusing function can be better understood with reference to the following drawings. The components in the drawings are not necessarily to scale, the emphasis instead being placed upon clearly illustrating the principles of the present digital camera module with an auto-focusing function. Moreover, in the drawings, like reference numerals designate corresponding parts throughout the several views.

DETAILED DESCRIPTION OF PREFERRED EMBODIMENTS

Figure 1:
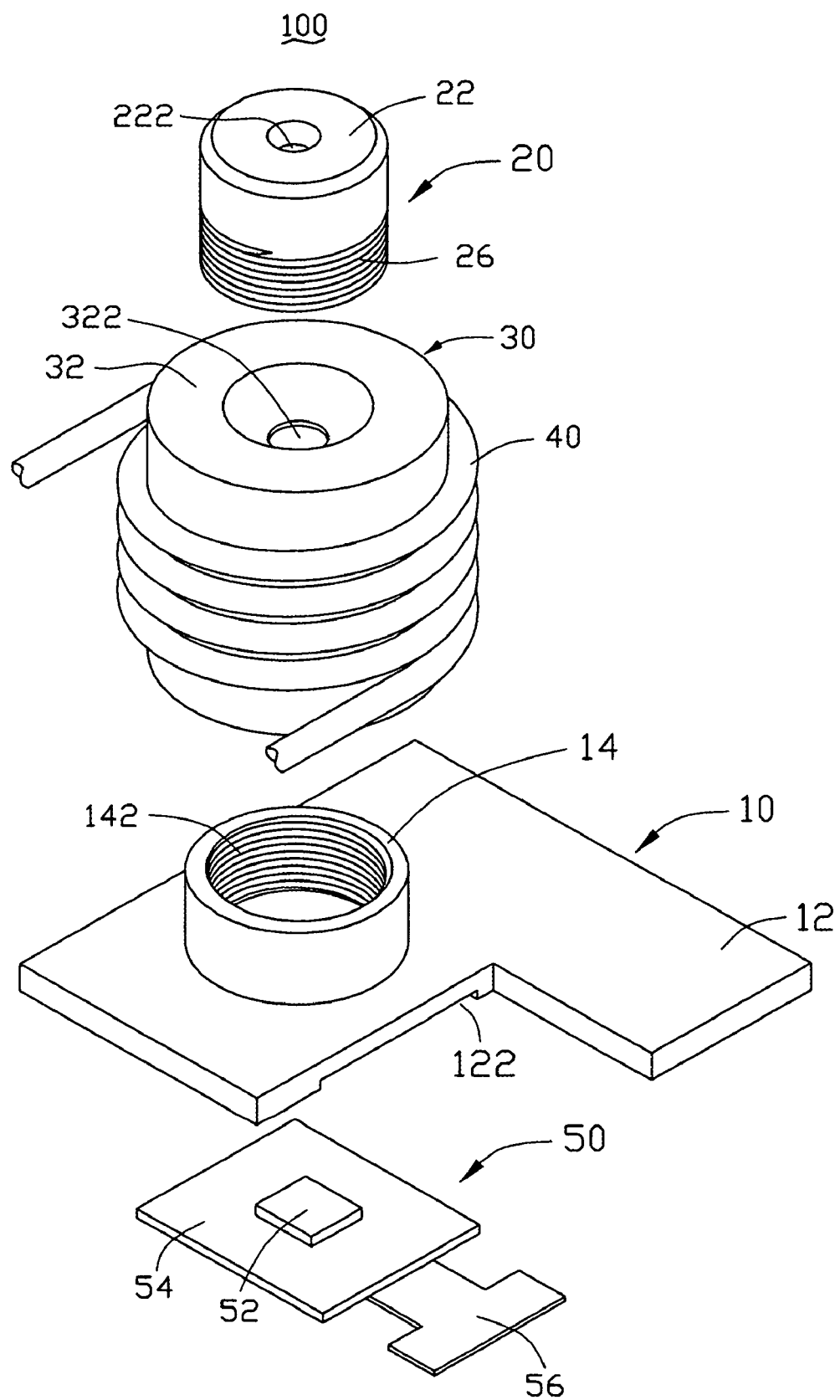
FIG. 1 is an exploded, isometric view of a digital camera module with an auto-focusing function, in accordance with one preferred embodiment.

Referring now to the drawings, FIG. 1 shows a digital camera module 100 with an auto-focusing function, according to a preferred embodiment. The digital camera module 100 is adapted for use in portable electronic device such as a mobile phone or a Personal Digital Assistant (PDA), but the compact nature thereof could prove useful in compact digital camera units or digital camcorders, as well. The digital camera module 100 includes a lens mount 10, a lens barrel 20, a sleeve 30, a voice coil actuator 40, and an image pick-up module 50. The lens mount 10 is mounted on and/or above the image pick-up module 50. The sleeve 30 receives the lens barrel 20 mounted on and/or in the lens mount 10. The voice coil actuator 40 is wound around an outside of the sleeve 30.

The lens mount 10 includes a L-shaped plate 12 and a round lens holder 14 located on the L-shaped plate 12. The L-shaped plate 12 defines a rectangular groove 122 in the bottom thereof. The lens holder 14 is a hollow cylinder with two open ends so that light beams can be transmitted therethrough. The lens holder 14 defines a receiving cavity (not labeled) inside. The inner periphery of the lens holder 14 is designed with an internal thread 142.

The lens barrel 20 is a hollow cylinder with an open end (not labeled) and a half-closed (i.e., partially-closed) end 22 and receives a plurality of lenses 24 (referring to FIG. 2) therein. The lens barrel 20 defines a hole 222 in the center of the half-closed end 22 so that light beams can be transmitted therethrough. The lens barrel 20 has an external thread 26 on the outside thereof adjacent the open end. The external thread 26 of the lens barrel 20 corresponds to the internal thread 142 of the lens mount 10. The lens barrel 20 is placed in and engages with the lens holder 14 of the lens mount 10. The lens barrel 20 is axially located in the receiving cavity of the holder 14. The lens barrel 20 is capable of moving axially under the influence of the voice coil actuator 40 due to the presence of the screw engagement between the lens barrel 20 and the lens holder 14 of the lens mount 10.

The lens barrel 20 is beneficially made of a plastic mixed with a metallic nano-powder (i.e., a plastic/nano-powder composite). The metal nano-powder is magnetic (i.e., capable of being attracted by an appropriately polarized magnet and/or being permanently magnetized) in nature. The magnetic metal nano-powder can be selected a group consisting of manganese-zinc-ferrite, nano cobalt particles, and nano nickel particles, or a combination thereof. Nanoparticles of other materials (e.g., iron; alloys containing a sufficient amount of cobalt, nickel, and/or iron) capable of displaying magnetic behavior would also be considered appropriate. The metal nano-powder is nano-scale in the approximate range of 1-100 nanometers. The metal nano-powder is beneficially essentially equally distributed throughout the lens barrel 20. Due to this even distribution, the action of the voice coil actuator 40 upon the lens barrel 20 can be expected to be essentially uniform, contributing to a highly controllable focusing operation.

The weight percent of the metal nano-powder in the composite used for lens barrel 20 is dependent on the electromagnetic capability of the voice coil actuator 40 and on the magnetic properties displayed by the metal nano-powder. The weight percent of the metal nano-powder in the lens barrel 20, in most instances, is generally less than about one percent of the plastic matrix material (i.e., ~99 wt %, or more, plastic). Since the composite used for the lens barrel 20 is made of such a high proportion of plastic, the weight of the lens barrel 20 is effectively minimized. In manufacturing, it is required that the metal nano-powder is mixed in the plastic to form the composite material. The lens barrel 20 is advantageously manufactured by first forming the plastic composite and then injecting the plastic composite into an appropriate mold, thereby achieving the desired shape.

The sleeve 30 is a hollow cylinder with an open end (not labeled) and a half-closed (i.e., partially-closed) end 32. The sleeve 30 defines a hole 322 in the center of the half-closed end 32 so that light beams can be transmitted therethrough. An inner diameter of the sleeve 30 is slightly larger than an outer diameter of the lens holder 14 of the lens mount 10. The sleeve 30 is located around the lens holder 14 of the lens mount 10 via the open end thereof and receives the lens barrel 20 therein. The voice coil actuator 40 is formed, e.g., by winding one or more conductive metal wires around the sleeve 30. Alternatively, the voice coil actuator 40 could be a separate component, including one or more conductive windings as a part thereof, capable of being positioned around the sleeve 30.

The image pick-up module 50 includes a image pick-up sensor 52, a printed circuit board 54, and a flexible circuit board 56. The image pick-up sensor 52 can, for example, be a Complementary Metal-Oxide Semiconductor (CMOS) type sensor or a Charge Coupled Device (CCD). The image pick-up sensor 52 is electrically connected with the printed circuit board 54, and the printed circuit board 54 is electrically connected with the flexible circuit board 56. The image pick-up sensor 52 is disposed on the center of the printed circuit board 54. The image pick-up sensor 52 aligns with the open end of the lens holder 14 of the lens mount 10 such that the lens holder 14 of the lens mount 10 is capable of routing the input light beams, corresponding to an image being photographed, to the image sensor 52. A right end of the printed circuit board 54 is connected with the flexible circuit board 56 so that an image signal can be output to a signal processing unit (not labeled).

Figure 2:
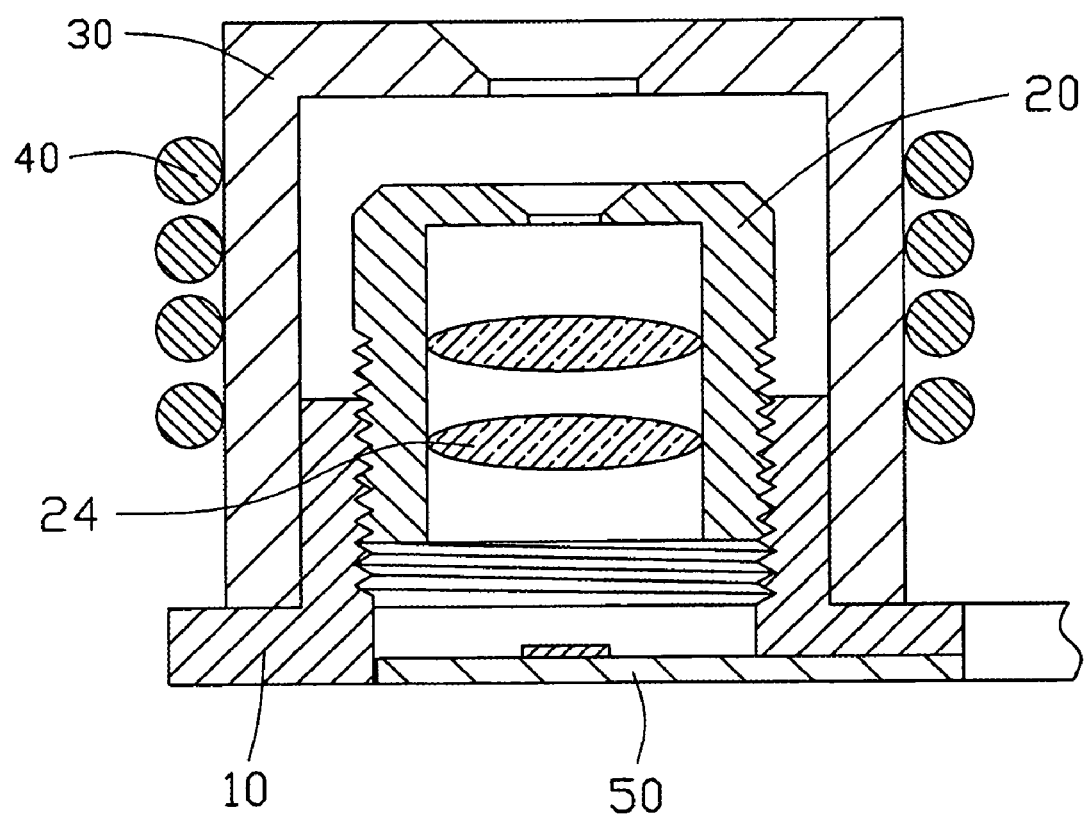
FIG. 2 is an cross-sectional, assembled view of the digital camera module of FIG. 1.
Figure 3:
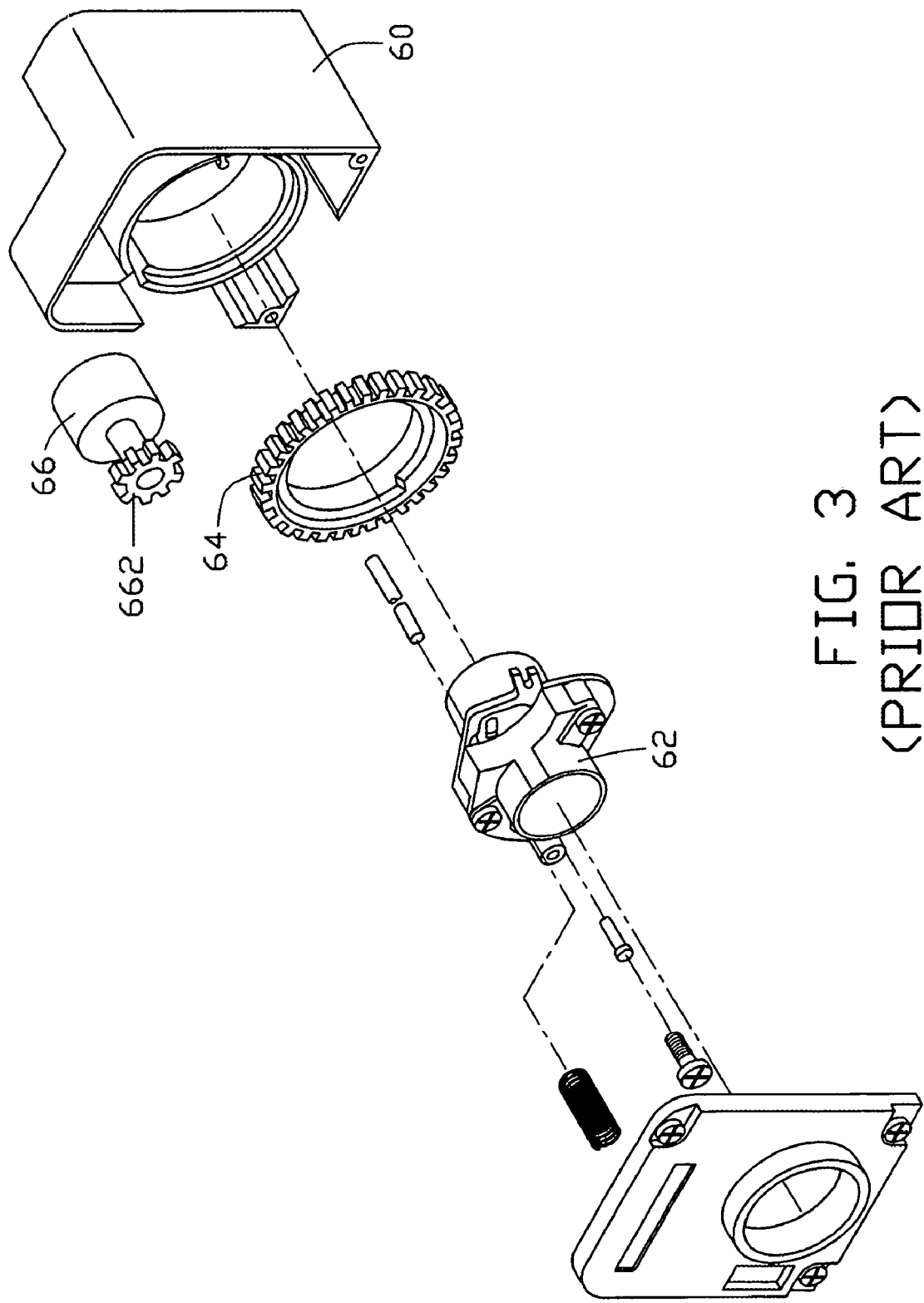
FIG. 3 is an isometric view of a conventional digital camera module with an auto-focusing function.
Figure 4:
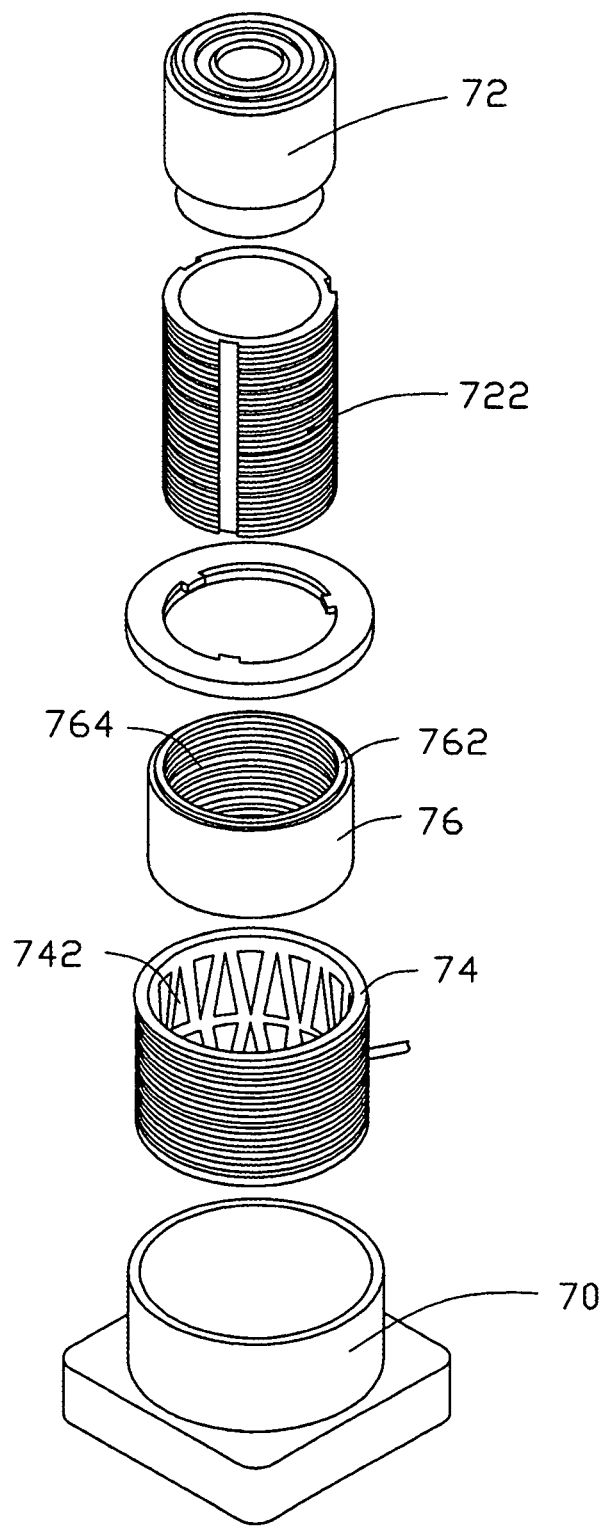
FIG. 4 is an isometric view of another conventional digital camera module with an auto-focusing function.

Referring now to FIG. 2, in assembling the digital camera module 100, the lens mount 10 is fixed on the print circuit board 54 of the image pick-up module 50 by glue or another adhesive, with the image pick-up sensor 52 aligning with the open end of the lens holder 14 to receive a light signal thereupon. The printed circuit board 54 is received in the rectangular groove 122 of the L-shaped plate 12 of the lens mount 10. Then, the lens barrel 20 is rotated into and mounted on the lens holder 14 of the lens mount 10, with the external thread 26 of the lens barrel 20 engaging with the internal thread 142 of the lens holder 14. The voice coil actuator 40 is wound around the outside of the sleeve 30, and the sleeve 30 is located around the lens holder 14 and the lens barrel 20.

In use, the digital camera module 100 is equipped within a portable electronic device, such as mobile phone, and the voice coil actuator 40 is electrically connected with a circuit board of the mobile phone for capturing electrical power. Because the lens barrel 20 is made of a plastic filled with a magnetic nano-powder, the lens barrel 20 is also magnetic and can thus be influenced by an electromagnetic field. When the voice coil actuator 22 is induced with a current flow, the coil 22 generates a magnetic field, which may be same as or contrary to the magnetism of the lens barrel 20. Thus, a magnetic force that may be a magnetic attractive force or a magnetic repulsive force is generated between the lens barrel 20 and the lens holder 14. The magnetic force can make the lens barrel 20 rotate. During the rotation course of the lens barrel 20 relative to the lens holder 14, the lens barrel 20 moves axially relative to the lens holder 14 under the thread engagement between the external thread 26 of the lens barrel 20 and the internal thread 142 of the lens holder 14, thereby resulting in the stable telescopic movement of the lens barrel 20. Thus, the focusing purpose is achieved by changing the distance between the image pick-up sensor 52 and the lenses 24 in the lens barrel 20.

A main advantage of the digital camera module 100 with an auto-focusing function is that a magnetic field loop is produced directly between the voice coil actuator 40 and the lens barrel 20 to drive the telescopic movement of the lens barrel

20. There are no additional elements between the voice coil actuator 40 and the lens barrel 20, such as a magnet or a stepper motor. The digital camera module 100 thus has a simple, compact structure.

It is to be understood, however, that even though numerous characteristics and advantages of the present embodiments have been set forth in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A digital camera module with art auto-focusing function, comprising:
    a lens mount;
    a lens barrel having at least one lens positioned therein, the lens barrel being directly engaged with the lens mount, the lens barrel being made of a composite material having a magnetic metallic nano-powder therein;
    a voice coil actuator adapted for cooperating with the lens barrel to form a magnetic loop; and
    an image pick-up module disposed under the lens mount, the image pick-up module being configured for receiving from the at least one lens light corresponding to an image.

2. The digital camera module as claimed in claim 1, wherein the magnetic metallic nano-powder is selected a group consisting of manganese-zinc-ferrite, nano cobalt particles, and nano nickel particles, or a combination thereof.

3. The digital camera module as claimed in claim 1, wherein the composite material used for the lens barrel is made of a plastic mixed with the magnetic metallic nano-powder.

4. The digital camera module as claimed in claim 3, wherein the magnetic metallic nano-powder in the lens barrel has a weight percent less than about one percent.

5. The digital camera module as claimed in claim 4, wherein the magnetic metallic nano-powder is essentially equally distributed throughout the plastic of the lens barrel.

6. The digital camera module as claimed in claim 1, wherein the lens barrel is manufactured by an injection molding process.

7. The digital camera module as claimed in claim 1, further comprising a sleeve, the voice coil actuator being located outside of the sleeve, the sleeve being attached to the lens mount and covering the lens barrel.

8. The digital camera module as claimed in claim 7, wherein the lens mount comprises a plate and a cylindrical lens holder disposed on the plate, the lens holder being engaged in the sleeve.

9. The digital camera module as claimed in claim 1, wherein the lens holder has internal thread defined in peripheral wall thereof.

10. The digital camera module as claimed in claim 9, wherein the lens barrel has external thread defined in outer peripheral wall thereof, the external thread thereof being configured for movably engaging with the internal thread of the lens holder.

11. The digital camera module as claimed in claim 1, wherein the image pick-up module includes an image pick-up sensor, a printed circuit board, and a flexible circuit board.

12. The digital camera module as claimed in claim 11, wherein the image pick-up sensor is electrically connected with the printed circuit board, and the printed circuit board is electrically connected with the flexible circuit board.

13. A digital camera module with an auto-focusing function, comprising:
    a lens mount including a lens holder;
    a lens barrel having at least one lens positioned therein, the lens barrel being directly engaged with the lens holder, the lens barrel being made of a composite material having a magnetic metallic nano-powder therein;
    a sleeve covering the lens barrel and the lens holder;
    a voice coil actuator winding an outside surface of the sleeve, the voice coil actuator being adapted for cooperating with the lens barrel to form a magnetic loop; and
    an image pick-up module disposed under the lens mount, the image pick-up module being configured for receiving from the at least one lens light corresponding to an image.

14. The digital camera module as claimed in claim 13, wherein the magnetic metallic nano-powder is selected a group consisting of manganese-zinc-ferrite, nano cobalt particles, and nano nickel particles, or a combination thereof.

15. The digital camera module as claimed in claim 13, wherein the composite material used for the lens barrel is made of a plastic mixed with the magnetic metallic nano-powder.

* * * * *